United States Patent Office 2,990,689
Patented July 4, 1961

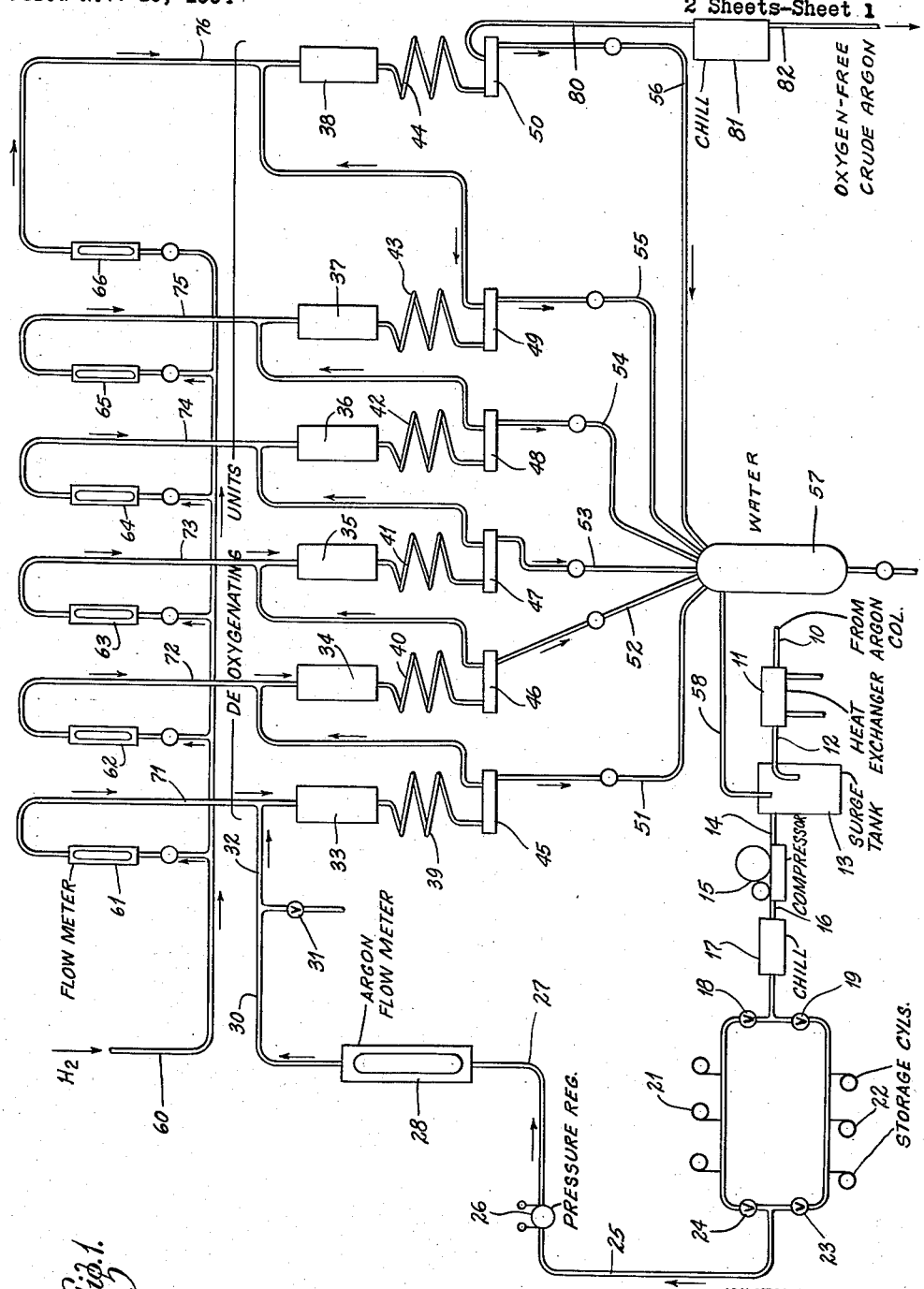

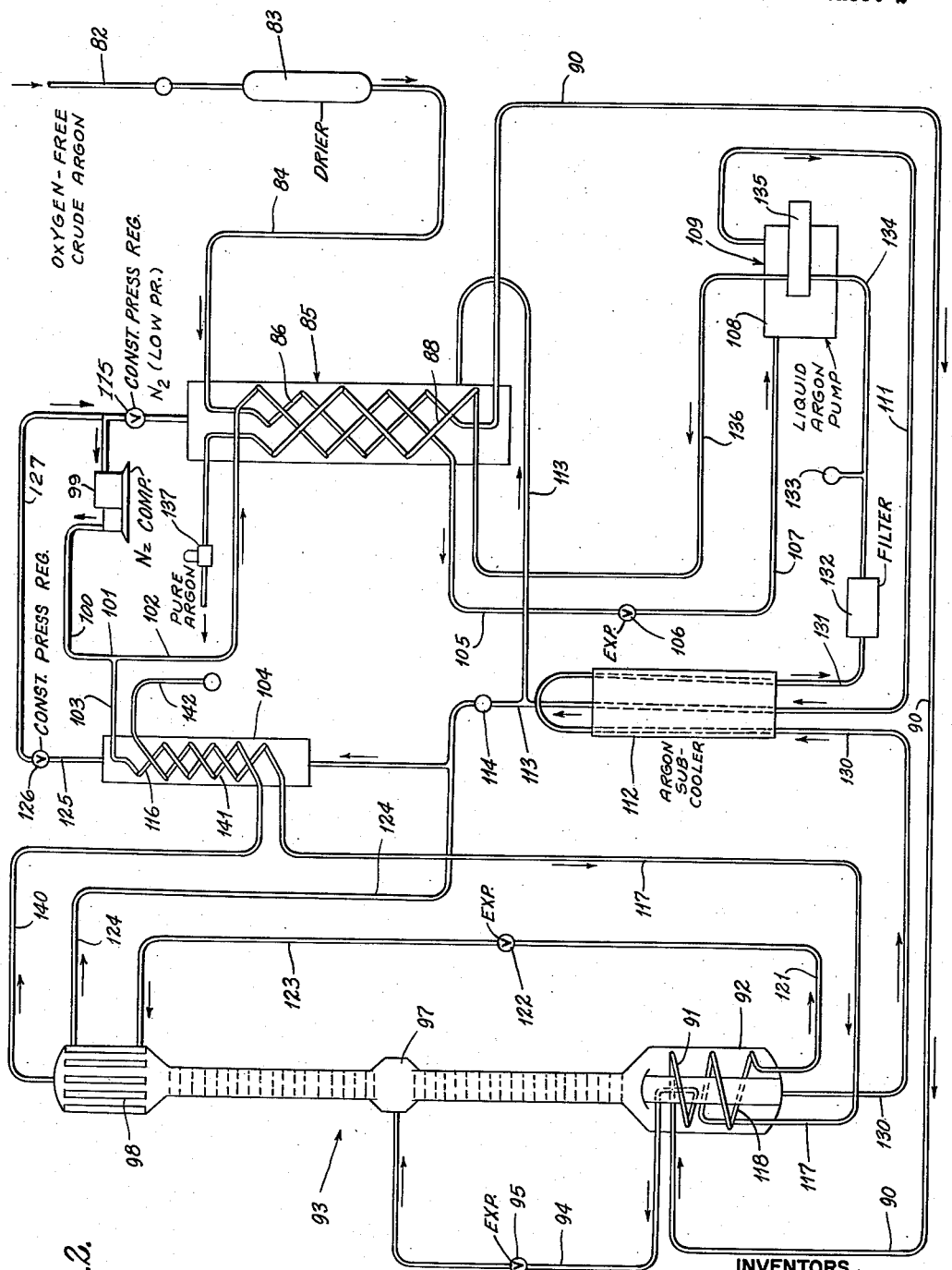

2,990,689
METHOD AND APPARATUS FOR THE PRODUCTION OF ARGON
Herman A. Lorenz, Belleville, Ill., and Isaac H. Levin, deceased, late of Belleville, Ill., by Russell H. Classen, administrator, Freeburg, Ill., assignors to Independent Engineering Company, Inc., O'Fallon, Ill., a corporation of Illinois
Filed Nov. 19, 1954, Ser. No. 470,062
23 Claims. (Cl. 62—22)

This invention relates to improvements in low temperature process control for gases. In particular, it is concerned with a method and apparatus for the control and maintenance of extremely low temperatures by the utilization of the latent heat of a partially liquefied refrigerant gas which has been expanded from a high pressure.

This invention is particularly useful in the production of extremely high purity argon from the air. The method and apparatus of this invention are adapted to be used either simultaneously with conventional double column oxygen plants in the operation thereof, or independently.

By means of this invention, crude argon from a double column air rectification plant may be rectified to an extremely high purity with a minimum of complicated apparatus, and with control by unskilled workmen. The crude argon is obtained from the oxygen rectification column and then processed according to the dictates of this invention.

In the conventional double column air rectification plant for the production of oxygen, air is generally passed through heat exchangers countercurrently to the outgoing cold product gases such as oxygen, nitrogen and crude argon, one or more of which may be at a pressure substantially above atmospheric pressure, sometimes as high as 3,000 p.s.i. or higher. The air is then introduced into the bottom portion of the oxygen column as a mixture of liquid and vapor. This air is under pressure, which is determined by the refrigeration requirements of the system, and is frequently expanded into the lower portion of the first column to a lower pressure usually in the order of 5 to 7 atmospheres. In this first column, the air is partially separated to yield an oxygen rich liquid which is withdrawn from the bottom of the column and introduced at an intermediate fractionating stage in the second column at a still lower pressure, usually several pounds per square inch above atmospheric pressure, and a nitrogen rich reflux liquid withdrawn from the upper part of the lower column below the condenser-reboiler and introduced into the top of the second column.

In this second column, which is generally built on top of the first column, the crude oxygen, which may be of a composition varying from thirty to fifty percent oxygen, depending upon process requirements, is further rectified.

The rectification results in a descending liquid stream becoming more and more rich in oxygen until the maximum percentage of oxygen is reached in the condenser-reboiler. The function of the condenser-reboiler is to simultaneously provide a reflux liquid for both the upper and lower columns and to provide boil-up vapors for the upper column. The nitrogen rich reflux entering the top of the upper column serves to reduce the oxygen content in the overhead gases to a point well below that level which would be obtained if air only were used as a reflux. The double column, as has been demonstrated and is well known in the art, can produce simultaneously a product from the bottom of the upper column extremely rich in oxygen and a product from the top of the upper column with practically no oxygen. With the proper number of plates of good design, oxygen purities of 99.5% or higher can be simultaneously obtained with an overhead gas leaving the top of the column containing less than 0.1% oxygen.

Many refinements of the double column air rectification plant are in practice, but in essence in this practice and also in any single column rectification plant or other air rectification process for the production of oxygen, the principle is to obtain, by rectification, separation of the oxygen in high purity as a liquid from the nitrogen as a vapor. Nitrogen boils at −195.8° C. and oxygen boils at −183° C., and since argon boils at −186.3° C., in most processes for the production of argon, the argon will be taken off in a comparatively oxygen-rich fraction.

In certain air fractionating plants, extremely high purity nitrogen is the most desired product, and a stream of gas containing about the same amount of oxygen as air, but a much higher percentage of argon than air, is removed at an intermediate fractionating stage of the column. It will be clear that argon of the highest purity can be obtained by the process to be outlined whether the crude argon is nitrogen rich or oxygen rich. However, in air fractionating plants where argon as a product is of primary importance, the crude argon is usually taken off from an oxygen rich fraction.

In the air feed, argon is present in the amount of about 0.93%. In existing practices, such as the double column oxygen plant, an argon enriched fraction is withdrawn from the second column several trays below the introduction point of the crude oxygen, since it is at this point that the argon is at the highest percentage in the air fractionating column. There the ratio of argon may be between 10 and 20%, generally at the lower portion of this range, with a small percentage of nitrogen, usually less than one-half of one per cent nitrogen, and with the remainder oxygen. This fraction is sometimes called raw argon and is hereinafter so referred to. This raw argon fraction is then conventionally rectified to a crude argon in a so-called argon side arm column.

The argon side arm consists of a rectification column of conventional type that separates an argon rich fraction as a gas or liquid at the top of the column, and an oxygen rich fraction as a liquid at the bottom of the side arm column. The oxygen rich fraction is then usually recycled back to the second column of the oxygen plant and introduced at a point below the crude oxygen inlet roughly corresponding to the point where the raw argon fraction was removed.

The ascending vapors within the argon side arm are enriched in argon and nitrogen and are cycled through a reflux condenser for further enrichment.

Depending upon the type of process, we have found that there is considerable variation in the composition of the product vapor taken from the argon side arm. Representative analyses of this vapor from various types of processes show compositions containing about 0.5% nitrogen or less and 20 to 30% oxygen or more to those containing from 10 to 15% nitrogen and 3 to 10% oxygen. We have found satisfactory recovery of argon with mixtures containing about 2 to 3% nitrogen, 6 to 9% oxygen and the balance argon. It is this crude argon which must subsequently be purified in a very exacting process to a percentage of at least 99.90% argon. Recent requirements are for argon with a percentage of about 99.95% to 99.98% argon. Argon with these purities can readily be obtained by the method taught in this invention.

In general, the argon production in existing oxygen plants is of a by-product nature, and since the oxygen is usually the most important product, various adjustments of the oxygen plant are made with the objectives of maintaining the purity of the oxygen product and of improving the oxygen yield. Those changes may be reflected unfavorably in the argon-rich fraction taken from the second column. It is well known that a minor change in the composition of the oxygen product can result in a subsequently much greater change in the composition of the crude argon.

In existing processes for the production of high purity argon, a crude argon of roughly 75 to 90% purity from the argon side arm is subsequently purified in argon purification systems wherein a very close control is required. This necessitates complicated control equipment and skilled workmen. The previously-mentioned changes in the composition of the various product streams in the oxygen plant add to the control problem. The separation of argon from oxygen must be by chemical means and the separation of argon from nitrogen must be by liquefying the argon at approximately −186° C., while keeping the nitrogen gaseous, in other words, by rectification means.

Many methods are accompanied by considerable losses of argon and in most methods the argon is withdrawn as a low pressure gas which is piped to a low pressure gas holder of comparatively large dimensions, thus taking up considerable valuable plant space. The gaseous argon must then be compressed to a high pressure in order to charge it into storage or transport cylinders. The compressors used must be of extremely special manufacture in order that there will be no possible contamination of the purified argon by the atmosphere.

In certain other processes, the argon may be liquefied and stored and transported in the liquid state. Unless expensive refrigeration systems are installed to maintain the liquefied argon in the liquid stage, there will be considerable losses due to inflow of heat through even the best insulated vessels. Any argon thus vaporized must be either lost or reliquefied.

In other processes, the argon can be produced at any pressure required whether for charging into piping lines or to cylinders, or it can be produced as a liquid without any additional equipment other than that required for the purification of the argon. This may be done by heat exchange against a mixture of liquid nitrogen and oxygen (primarily oxygen). But as is evident, little temperature tolerance may be allowed because a few degrees excess cold not only liquefies the argon, but even freezes it.

By means of this invention, a very close control of the temperature of the crude argon and purified argon has been obtained by the use of a refrigerant, which, by its very nature, prevents cooling to so large a degree as would cause freeze-up, and yet amply supplies all the cooling needs. All this has been effected with the elimination of complicated controls and apparatus in a process which can be practiced by unskilled workmen.

Further, the process of this invention can be practiced in conjunction with or separately from the operation of existing oxygen plants. Thus, complete dependence upon the oxygen production and its attendant variations in composition has been eliminated.

Also, by means of this invetnion, the cooling requirements for the rectification of crude argon to purified argon are supplied by nitrogen. The nitrogen is expanded by either a simple Joule-Thomson expansion or by an expansion engine from a high pressure to a lower pressure. This lower pressure is controlled in the cooling of the crude argon and the pure argon at a pressure of about 18 p.s.i.g. referred to a standard atmosphere of 14.7 p.s.i.a., i.e., a pressure of about 32.7 p.s.i.a. At this pressure, the boiling point of nitrogen is elevated to −188° C., and, by virtue of the refrigeration effect in the expansion from the high pressure, the nitrogen is partially liquefied. In this condition, the expanded nitrogen is prevented from falling below the freezing point of argon and still maintains a constant temperature during a major portion of its cooling load. Hence, the danger of freeze-up in the argon piping is eliminated. A conventional back pressure regulator is used to control the expanded pressure of the nitrogen at approximately 32.7 p.s.i.a. The entire source of the refrigeration in the argon purification process is from the nitrogen which makes the purification process exceedingly advantageous and easy to control.

Further, in this invention, high pressure nitrogen may be expanded from a high pressure to a few pounds pressure, somewhat below the 18 p.s.i.g. needed in the argon cooling stream, in order to provide a very cold temperature for the necessary refluxing at the top of the argon purification column. This temperature may be below the freezing point of argon since the mixture being refluxed has a lower freezing point due to its high nitrogen content.

In order to most advantageously supply the refrigeration requirements of the argon purification and rectification process, two main heat exchangers are utilized employing the refrigeration effect from the nitrogen supplied to the process. In these two heat exchangers, the refrigeration requirements for the argon purification column, including all of the product streams charged to the column, as well as the cooling requirements for the reflux condenser at the top of the column, are provided. In addition, the cooling requirements for the subcooling of the pure argon after it is withdrawn from the purification column and for the liquid argon pump are supplied.

This process is adapted to be run in either a continuous or a batch stage so as to be independent of the operation of the oxygen plant from which the crude argon is supplied. Thus, the argon-rich fraction which can be led off from the second column of the oxygen plant in the amounts of 10 to 20% argon and which is partially purified to substantially 90% argon in the argon side arm can be charged to a storage source. This storage source can comprise a number of banks of collection cylinders to store the crude argon.

In any oxygen plant run for a considerable period of time, the crude argon taken from the argon side arm will vary in composition and in rate of flow. In this method, the crude argon is compressed into a number of cylinders so that, after the cylinders are filled, regardless of the hour-to-hour change in composition or rate of flow of the crude argon delivered by the argon side arm, there will be a large volume of gas in storage of essentially very uniform composition. There can be several separate banks of these storage vessels and in each bank the crude argon will be of uniform composition. This crude argon can then be utilized in the ultimate argon purification process of this invention without the requirement of utilizing automatic controls to compensate for continuous variations in the argon percentages in the crude argon supply.

Further, in view of the requirements of this process which makes possible the purification of crude argon with only the supply of nitrogen as the refrigerant in the process, the ultimate purification can be run entirely independently of the oxygen production and the plant can be located wherever desired so as to be entirely independent of the double column oxygen plant. Both the crude argon and the nitrogen can be stored in cylinders or any high pressure tanks and located as desired.

In the purification process of this invention, the crude argon from the argon side arm preliminarily is subjected to an oxygen removal stage wherein the oxygen content of the crude argon is substantially eliminated. This elimination is to the extent of a final oxygen content of 5 parts per million or less, and is accomplished by the catalytic conversion of oxygen and hydrogen, in the presence of a palladium catalyst, to water. Subsequently, the water is removed in a drying operation so that, when the crude argon is supplied to the heat exchangers in the final purification system and ultimately to the argon purification column, all of the water and all of the oxygen to the extent of the order of 5 parts per million or less have been eliminated. The rectification of the crude argon containing now about 95% argon, more or less, with the remainder nitrogen and a very small percentage of hydrogen is then carried out, as will be described.

Accordingly, it is a primary object of this invention to provide a process for the low temperature control of a gas by utilizing the latent heat of a partially liquefied refrigerant gas which has been expanded from a high pressure.

It is a further object of this invention to provide a method and apparatus for the production of high purity argon from crude argon containing oxygen or nitrogen or both in varying ratios, in which complicated control apparatus can be obviated and wherein the argon purification is independent of variations in the composition and rate of flow of the product streams within the oxygen plant.

It is a further object of this invention to provide a method and apparatus for the production of high purity argon wherein conventional heat exchangers and an argon purification column can be utilized and the refrigeration requirements are supplied by a nitrogen stream.

Still a further object of this invention is to provide a method and apparatus for the production of high purity argon wherein the freezing of the argon is eliminated, and especially to eliminate that freezing by providing a coolant capable of boiling at a temperature below the freezing point of argon, but which is automatically controlled in pressure so as to elevate its boiling point to a degree that will prevent the temperature of the refrigerant from falling below the freezing point of the argon. Specifically, it is an object to provide such an arrangement that uses nitrogen as the coolant, which nitrogen may be obtained from the oxygen plant that produced the crude argon.

Yet another object of this invention is to provide a method and apparatus for the production of high purity argon in which the purification of the crude argon can be carried out entirely independently of the operation of the oxygen plant and at a different location therefrom by the furnishing as raw materials only the crude argon source and nitrogen.

Still another object of this invention is to provide a method and apparatus for the production of high purity argon wherein a crude argon material can be provided of essentially uniform composition and in which the oxygen can be substantially entirely removed so that the deoxygenated crude argon is supplied to the ultimate purification stage and rectified to pure argon with equipment and apparatus made of conventional components.

A still further object of this invention is to provide a method and apparatus for the production of high purity argon wherein a deoxygenated crude argon is rectified to provide the high purity argon and in which the refrigeration requirements are supplied by nitrogen under a controlled pressure to prevent the freeze-up of the argon conduits and the rectification column, by controlling the pressure of the nitrogen by conventional pressure regulation means. Especially, it is an object to provide a system of this kind wherein the principal controls for the argon rectification system comprise a simple flow control device for the crude argon mixture and a simple automatic control for the refrigerant.

Still another object of this invention is to provide a method and apparatus for the production of high purity argon wherein a high pressure refrigerant gas is expanded into two different low pressure and low temperature refrigerant streams. One of these streams is at or above the equilibrium temperature between the melting and freezing point of argon and is used for subcooling pure argon, while the other may be below the freezing point of argon and is used in the reflux operation at the top of the argon rectification column.

A further object of this invention is to provide a method and apparatus for the production of high purity argon having flexibility of operation, independent of the operation of the oxygen plant from which the crude argon source is obtained, and wherein the crude argon is supplied to a separate collection point so that various stores of crude argon of varying composition can be collected and charged to ultimate argon purification at a uniform composition in a batch or continuous run.

Still another object of this invention is to prevent the contamination of argon by substances other than water in the compression and handling stages so that the only impurity, which is water, can easily be removed by water traps and freeze-out devices and the like.

Still another object of this invention is to provide a convenient and relatively inexpensive method and apparatus for the production of high purity argon from crude argon which may be produced by several different sources, although each of said sources may produce a crude argon of different composition.

A further object of this invention is to provide a method and apparatus for production of high purity argon from crude argon in such a manner that the losses of argon and gases used in the purification are kept to a minimum.

Further objects of this invention will be apparent from the detailed description which follows.

For the purpose of illustration, a schematic diagram for the arrangement of the piping and the apparatus of this invention is shown in the accompanying drawings. It is to be understood that these drawings are for the purpose of example only and that the invention is not limited thereto, as will be clear from the following description.

In the drawings:

FIGURE 1 is a schematic diagram showing the deoxygenation and drying of crude argon; and FIGURE 2 is a schematic diagram showing the refrigerating heat exchangers and argon purification column for handling the deoxygenated and dried crude argon.

In FIGURE 1, the crude argon containing the oxygen stream 10 is connected at its source from the top of an argon side arm column connected in conventional manner to an oxygen plant (not shown), if the present argon purification process is to be used in conjunction therewith.

The piping 10 leads from the argon side arm column through the heat exchanger 11 where it is warmed to approximately atmospheric temperature. The crude argon is delivered by a conduit 12 to a low pressure gas holder or surge tank 13, and from thence by a conduit 14 to an argon compressor 15. From thence it is delivered by a conduit 16 through suitable purge bottles (not shown) to a chilling unit 17 and valves 18 or 19 to banks of storage cylinders 21 and 22, where the crude argon is collected in large quantity for ultimate use. Subsequently, the crude argon is released from the banks through valves 23 or 24 to piping 25, which is connected to a pressure regulator 26 and an argon flow meter 28 connected by piping 27. A sampling draw-off line 30 leading to a sampling valve 31 enables the operator to determine, by conventional means, the percentage of oxygen present in the crude argon entering the system.

The crude argon piping 32 is then introduced into a bank of deoxygenating units in series indicated at 33, 34, 35, 36, 37, and 38, respectively. In each one of the deoxygenating units, some oxygen is removed by combination with hydrogen on the surface of the catalyst. Since this reaction generates considerable heat, the water which results from the combination is in the form of vapor. In between each deoxygenated stage, the crude argon passes through cooling coils 39 to 44, which are immersed in a water tank where the water resulting from the combination of the hydrogen and oxygen is condensed and the crude argon gas is cooled to approximately room temperature. The condensed moisture is collected in water traps 45 to 50, which are provided with suitable drain valves and piping 51 to 56 through which the collected moisture is withdrawn to a main water trap 57. The trap 57 has a water drain valve through which the accumulated water can be withdrawn from time to time. The trap 57 also has an outlet line 58 connected to the low pressure crude argon gas holder. When the moisture traps 45 to 50 are drained, some crude argon may pass through the lines 51 to 56 into the water trap and out to the crude argon gas holder and thus not be lost.

A hydrogen stream 60 is introduced from a convenient source through control valves to flow meters 61 to 66 connected in parallel, and which lead through conduits 71 to 76, in order, to the inlet side of the deoxygenating units 33 to 38, respectively. The hydrogen, when contacted with the oxygen in the crude argon, in the presence of the palladium catalyst, forms water which flows to the water stream piping 51 to 56 to be collected in the main water trap 57. This completes the deoxygenation stage.

After leaving the water trap 50, the crude argon passes by a conduit 80 to a chilling unit 81 to remove additional moisture. Then, as seen in FIGURE 2, the oxygen-free crude argon in conduit 82 passes to a drier 83 which is charged with activated alumina to remove any last traces of moisture. An alternate method would be to condense and freeze out the moisture by refrigeration. The crude argon stream is then fed by piping 84 into a first or No. 1 heat exchanger 85.

This heat exchanger 85 is a four-pass exchanger which has provisions for accommodating three other streams besides the crude argon stream 86. These are the high pressure nitrogen stream 102 that flows in the same direction as the crude argon stream 86, the pure argon stream 88, and the low pressure nitrogen stream which flows in the heat exchanger shell. The latter two flow in a direction counter to that of the first-named streams 86 and 87.

The crude argon stream 86 passes from the bottom of the heat exchanger 85 by a conduit 90 to a pre-cooling coil 91 situated at the bottom section 92 of a rectification column 93. The coil 91 is connected at its other end to additional crude argon piping 94 which leaves the bottom of the column and is then connected to an expansion valve 95, after which it is introduced by a conduit 96 into an intermediate portion 97 of the column 93.

The argon rectification column 93, besides being provided with a pot 92 at its bottom, is additionally provided with a reflux condenser 98 at its top for cooling and condensing the rising gas to effect the most efficient rectification possible. Between its bottom and top, the column 93 has a plurality of trays, both above and below the crude argon inlet portion 97. Alternately to the trays, the column could be filled with suitable packing material.

The high pressure nitrogen stream 100 leads from a high pressure tank or compressor 99 to a junction 101 where it is split into a stream 102 leading to the first heat exchanger 85, and a stream 103 leading to a second heat exchanger 104. High pressure nitrogen leaves the bottom of the exchanger 85 through a conduit 105 after being conducted through the pass 87, and is connected to an expansion valve 106 which greatly reduces its pressure.

The resultant low pressure nitrogen is connected by a conduit 107 from the outlet side of the expansion valve 106 to a cooling jacket 108 surrounding a liquid argon pump 109, and therefrom by a conduit 111 to an argon subcooler 112. After passing through the argon subcooler, the low pressure nitrogen stream passes through a conduit 113 which is connected to a nitrogen crossover valve 114 which allows a portion of this low pressure nitrogen stream to be passed into the heat exchanger 104, if desired. This may be particularly desirable at the beginning of the operation to allow rapid refrigeration of the top of the column alternatively. As will further appear, part of the low pressure nitrogen from the top of the column may be mixed through the valve with the stream 113 passing to the heat exchanger 85. This gives full refrigeration control for the system.

The low pressure nitrogen stream in the conduit 113 then is introduced into the shell at the bottom of the first heat exchanger 85, and passes out at the top thereof where it is connected to the back pressure regulator 115. It may then be conducted back to a nitrogen compressor for recycling as the original high pressure nitrogen in the system.

The second high pressure nitrogen stream 103 travels into pass 116 at the top of the second heat exchanger 104 and leaves the bottom thereof to be conducted by conduit 117 through the bottom of the pot 92 in the column 93. This high pressure nitrogen stream then passes through a coil 118 at the very bottom of the pot and then passes out at the bottom again by piping 121 to a reflux expansion valve 122 which greatly reduces its pressure.

A second low pressure nitrogen stream 123 leads from the exit side of the expansion valve 122 and is introduced to the bottom of the condenser 98 at the top of the column. From the top thereof, the nitrogen stream leads by a conduit 124 to the nitrogen crossover valve 114. Ahead of this valve, however, a portion is branched off into the shell of the heat exchanger 104. Connected to the top of the heat exchanger 104 is a conduit 125 for recycling this low pressure nitrogen stream through a pressure regulator valve 126 and a conduit 127 back to the compressor for eventual reuse as high pressure nitrogen stream in the process.

Connected to the bottom of the pot 92 in the rectification column 93 is a conduit 130 for the pure argon stream, which leads to the argon subcooler 112 and therefrom by a conduit 131 to a filter 132 and a liquid draw-off valve 133 where liquid argon may be withdrawn as an end product where desired. If liquid argon is not desired, the argon travels through a conduit 134 to the pump section 135 of the liquid argon pump 109. The pure argon stream is then pumped through a conduit 136 to the pass 88 at the bottom of the heat exchanger 85 and passes out at the top thereof to a pressure regulator 137 and a manifold (not shown) for ultimate charging into cylinders, or to pipe lines.

At the very top of the rectification column, the waste gas stream is connected by the conduit 140 to the bottom of the pass 141 of the heat exchanger 104. It is then conducted from the top of the heat exchanger to a waste gas disposal vent 142.

*Operation*

In the operation of this process, crude argon containing oxygen is collected in sufficiently large quantities in the storage banks 21 and 22 to minimize variations in composition and to permit a determination of the composition of the entire batch, and thereby to permit further treatment of that batch by a single adjustment to accommodate that one composition. An oxygen plant producing 300 c.f.h. of argon might be operated to accumulate four of five days output, as a typical batch. Then, despite occasional variations of, for example, one or two percent from time to time in the argon content of the crude delivered to the storage vessels, the total batch will have a single composition. Hence, the argon plant may be set up preset for a long operation without requiring further adjustment to composition. The importance of this will become evident later.

It is noted that the crude argon charged from the argon side arm or other source is compressed by the compressor 15 before being charged to the storage banks 21 and 22. This compression is effected by a water-lubricated argon compressor, since any impurities introduced by a water-lubricant in the compression stage can be removed much more easily than can oil vapors derived from the conventional lubricants. A portion of the water impurity which may be introduced by the water-lubricated crude argon compressor may be preliminarily removed in the chilling unit 17 disposed between the storage banks and the crude argon compressor, and which is maintained at a temperature just slightly above the freezing point of the water vapor in the crude argon.

The crude argon from the batch is taken from the storage banks at a pressure of about 50 p.s.i.g., which is obtained by proper regulation of the pressure regulator 26. The pressure of this crude argon is variable to higher or lower pressures; and the pressure selection depends upon whether more or less internal cooling is desired when the crude argon is expanded through the expansion valve 95 to the lower pressures prevailing in the argon purification column.

This crude argon, which, as a typical composition, may contain 90% A, 2½% $N_2$ and 7½% $O_2$ is adjusted in flow to the desired rate through the argon flow meter 28 and is sampled through the conventional sampling device. This sampling device is for the determination of oxygen and may be in the form of a standard Orsat testing device. After the amount of oxygen in the crude argon has been determined, the crude argon is passed through the deoxygenating units 33 to 38.

The number of deoxygenating units can be varied by appropriate valving provisions (not shown), and the number of deoxygenating units used is dependent upon the percentage of oxygen in the crude argon. Thus, each deoxygenating unit, for the purposes of example, may be effective for removing about two percent oxygen in crude argon. Where the total oxygen in the crude argon is of the amount of ten percent, for example, five deoxygenating units would be required. Similarly, for higher or lower percentages of oxygen, more or less deoxygenating units may be employed.

After the crude argon has been sampled and tested, a sufficient amount of hydrogen is charged to each one of the deoxygenating units employed to meet the stoichiometric requirement for conversion to water. Hydrogen, slightly in excess thereof in total quantity, is charged to each one of the deoxygenating units employed to insure full reaction with the oxygen present to form water in the presence of the palladium catalyst used in the respective deoxygenating units.

It is the purpose to employ the slight excess of hydrogen in the deoxygenating system to insure the substantially complete elimination of any oxygen in the argon to the extent of less than five parts per million. This is desirable as any oxygen left in the argon will not be removed therefrom in the rectification column; whereas hydrogen is one of the so-called non-condensible gases and will be removed at the top of the purification column with nitrogen, and is, relatively speaking, no problem in the purification system.

The water formed in the deoxygenating units is condensed in the cooling coils 39 to 44 and is removed through the respective water traps 45 to 50 and collected in the main water trap 57 and removed to disposal. Any crude argon gas vented with the condensed water is vented from the top of the water trap 57 through the conduit 58 and returned to the inlet of the crude argon compressor through the surge tank 13 so that the loss of valuable argon will be kept to a minimum.

The now deoxygenated and partially dry crude argon stream is then passed through the chilling unit 81 and the drier 47 (FIGURE 2). This drier is charged with activated alumina which has a great affinity for water vapors and the crude argon is thereon dried to a very low dewpoint in the order of —80° C. and lower, so that the water content is very low. This drier removes practically the last trace of moisture within the crude argon so that the crude argon now contains as impurities only in the order of two to three percent nitrogen and a very small amount of hydrogen.

The unit is then put on stream. It is a signal feature of this invention that the cooling capacity of the nitrogen refrigerating stream can be increased or decreased by varying the pressure of the high pressure nitrogen stream but without changing the lowest refrigerating temperature by maintaining the low pressure expansion through the conduit 107 to about 18 p.s.i.g. Thus, if it should be determined that more refrigeration is required, the nitrogen is charged to the system at, for example, 1,500 p.s.i.g. whereas if less refrigeration is needed, a pressure of 1,000 p.s.i.g. is utilized. It is to be understood that these pressures are given for the purpose of example only, as is also the case where crude argon gas compositions are given, and that the invention is not limited thereto.

In the expansion of these high pressure nitrogen streams, it is obvious that at the higher starting pressure more nitrogen will be liquefied by the pressure reduction to 18 p.s.i.g. than at the lower starting pressure. Since it is the latent heat of the liquefied nitrogen that furnishes the constant refrigeration effect, more cooling at the equilibrium temperature of this nitrogen at 18 p.s.i.g. will, therefore, be available where there is more liquid nitrogen. However, it is obvious that at the expanded pressure of 18 p.s.i.g. the temperature will be the same constant temperature in all cases. By this means, therefore, the system can be designed to rectify different compositions of crude argon having different boiling and freezing points under varying conditions of pressure.

As previously described, two streams of high pressure nitrogen are utilized, and one of these streams is employed after expansion, and consequent cooling, to refrigerate the liquid argon pump, the argon subcooler, and heat exchanger 85 in that sequence. In the course of this operation, a slight pressure drop of the low pressure nitrogen stream in the order of about 2 p.s.i. is brought about.

Thus, through the liquid argon pump and the argon subcooler, a drop in pressure of 1 to 2 p.s.i. may be effected, and at this pressure, when the liquid nitrogen is in equilibrium with its vapor, the temperature will be slightly reduced below the temperature of —188° C. which is the boiling point at 33 p.s.i.a. for nitrogen. However, the argon passing in heat exchange relationship with this stream of nitrogen never actually attains the low temperature of the nitrogen and is a couple of degrees higher so that it is maintained above its freezing point but still substantially below its boiling point, as desired.

The low pressure nitrogen, after leaving the argon subcooler in this particular stream, has imparted most of its refrigerant effect to the liquid argon stream and thereby substantially all of the nitrogen in the liquid phase has been vaporized and the latent heat therefrom has been used. Accordingly, the low pressure nitrogen, as it flows back through the heat exchanger 85 after passing through the pump and subcooler, will be in the form of a gas and will rise in temperature so that when it leaves the heat exchanger it is just slightly below the temperature of the entering high pressure nitrogen which is in countercurrent heat exchange relationship therewith. This temperature is usually substantially room temperature.

At the very start of the operation, the column is operated at about 20 p.s.i.g., and the nitrogen after being expanded through the valve 122 is at about 18 p.s.i.g. These pressures are observed in order to prevent freeze-up of argon at the top of the column, since at the very start of the rectification process a high concentration of argon will be present in the upper regions and it is not until after the process has been in operation for some time that any substantial rectification is obtained. If desired, at the beginning of this operation, the crossover valve 114 may be operated to admit a portion of the low pressure nitrogen from the conduit 113 which provides for a rapid refrigeration regulation.

As the rectification process is continued, the concentration of the argon at the top of the column drops very markedly and the pressure within the column can be reduced to about 4 to 5 p.s.i.g. for maximum efficiency of rectification. Then the low pressure nitrogen stream expanded through the valve 122 can be reduced to about 4 p.s.i.g. or less to furnish a very cold temperature at the top of the column through the condenser 98 to effect the most substantial separation of argon possible. The lower the pressure of the nitrogen surrounding the condenser, the lower will be its temperature. Since there must be some temperature head across the condenser, it is important that the nitrogen be as cold as possible in order to prevent undue losses of argon with the waste gas stream, and for this reason the low pressure nitrogen through the condenser is usually kept at a pound or two less pressure than the column pressure.

The condition of the liquid nitrogen in the expanded nitrogen refrigerant through the condenser 98 determines whether too much or too little refrigeration is supplied to the process. If the liquid nitrogen begins to rise in the condenser 98, not enough of the nitrogen is being evaporated off, and it is obvious that too much refrigeration has been supplied to the process.

Under this condition, the high pressure nitrogen may be employed at a lower pressure so that the refrigerating capacity within the expanded low pressure nitrogen stream is less due to a lesser pressure drop.

Conversely, should the liquid level of the liquid nitrogen within the condenser 98 drop, it is apparent that too little refrigeration is present and the reverse of the step above mentioned will then be required. Thus, it is apparent that a wide variation and adaptability in range of the process has been effected.

With the over-all principles of operation of the refrigerating streams utilized in this invention having been explained above, the step-by-step operation and treatment of the various streams in the two heat exchangers, the argon subcooler, and pump, and the rectification column will now be described.

After leaving the drier 83, the crude deoxygenated and dried argon stream is charged to the top of the four-pass heat exchanger 85. Therein it is cooled, by counterflow against the pure argon stream 88 and the low pressure nitrogen stream in the shell of the heat exchanger to at or near its liquefying temperature. The crude argon, after leaving the heat exchanger 85, is charged to the crude argon coil 91 at the bottom of the argon rectification column, wherein it gives up heat to provide boil-up in the lower portion of the column, and is further cooled and liquefied. The crude argon then is passed from the exit side of the coil 91 outside the column through the expansion valve 95 wherein the pressure is dropped from some 55-65 p.s.i.a. to preferably about 18-19 p.s.i.a. in the column 93. Its boiling point at that pressure is between 5° to 5½° C. higher than its freezing point compared to only a 3.9° C. spread at atmospheric pressure.

The rectification column 93 is a modification of the compound column of standard type and has the two coils 91 and 118 at the kettle 92 at the bottom of the column, above which are a series of fractionating trays. At the top of the column is the condenser 98, where the coldest possible temperature is desired. The crude argon containing argon and a few percent nitrogen introduced into the mid-portion 97 of the column is fractionated, with the higher boiling point argon being enriched and collected as liquid at the bottom of the column as the nitrogen vapors rise countercurrently. Reflux is provided for the upper portion of the column by means of the rising stream of gases being condensed by the cold liquid nitrogen surrounding the condenser tubes.

The argon is then removed through the pure argon conduit 130 to the argon subcooler 112. Both the coils 91 and 118 for the crude argon and the high pressure nitrogen, respectively, furnish some degree of heat to the bottom of this column in the kettle 92, but are of a low enough temperature to keep the condensed purified argon in liquefied form. At the same time the temperature of the crude argon and the high pressure nitrogen within the coils is lowered, and these cooled streams are subsequently employed at elevated points within the column. Thus, the crude argon introduced at the reduced pressure in the section 97 is at a lower temperature than the lower regions of the column, and the high pressure nitrogen which is reduced in pressure through the expansion valve 122 is cooled for the lowest temperature possible at the top of the column and condenser 98.

The pure argon leaving the rectification column in the stream 130 is passed to the argon subcooler 122 wherein it is cooled, but maintained at a temperature above the freezing point of argon by the control of the lower pressure nitrogen stream in the conduit 111 which is used for a refrigerant in said subcooler. It is subcooled about three to four degrees below its boiling point, at the pressure existing at that point in the system, which has been found necessary to avoid flashing during the subsequent pumping operation. If desired, the liquid argon may then be withdrawn as an end product through the draw-off valve 133 after first passing through the filter 132.

Where high pressure argon gas is desired, the pure argon stream is passed by the conduit 131 through the liquid argon pump 109, which is a conventional plunger type pump having intake and discharge check valves such as are well known in the art. In this pump, the temperature is maintained by the refrigerant effect of the low pressure nitrogen stream from the conduit 107 and is therein additionally controlled in temperature, as previously mentioned, by the regulation of the pressure of said nitrogen stream. The pure argon then is pumped at a higher pressure into and through the heat exchanger 85 and out to a pure argon manifold after leaving the heat exchanger for ultimate use.

The nitrogen refrigerant used in this process is obtained from a high pressure source at pressures of about 1,000 to 2,000 p.s.i.g., for the purpose of example. This nitrogen is introduced at the conduit 100 and is divided at 101, as previously mentioned, into two conduits 102 and 103. The former of these streams is introduced at the top of the heat exchanger 85 and passes countercurrently with the pure argon stream 136 and the low pressure nitrogen stream 113, whereby the high pressure nitrogen is cooled. After leaving the heat exchanger, the high pressure nitrogen stream in the conduit 105 is expanded in the expansion valve 106 to a pressure of about 33 p.s.i.a., which represents a temperature just above the freezing point of argon in the purification system. This pressure is maintained by the pressure regulator 115.

The expanded nitrogen stream 107 is then introduced as a coolant or refrigerant into the jacket 108 of the liquid argon pump 109, and the maintenance of the pressure at 33 p.s.i.a. prevents freeze-up of the liquid argon in said pump. After leaving this pump, the expanded stream 111 is introduced into the argon subcooler wherein the pure argon stream is preliminarily subcooled. Subsequently, the nitrogen stream 113 is recycled back to the heat exchanger 85 and is used concurrently with the pure argon stream 136 as a coolant in the heat exchanger. However, as mentioned previously, the crossover valve 114 may be used to regulate the flow of the streams 113 and 124 to change the refrigerant effects either at the condenser 98 or within the rest of the system as desired. The low pressure nitrogen in the shell of the heat exchanger 85 then passes to the pressure regulator 115 which controls the back pressure of the low pressure nitrogen stream to 33 p.s.i.a. at the expansion valve 106. The low pressure nitrogen then can be reintroduced to storage for ultimate compression and recycling in the process.

Returning to the junction 101 for the high pressure nitrogen stream 100, the second high pressure stream 103 is introduced into the pass 116 of the heat exchanger 104, wherein it is cooled. It is then subsequently introduced into the coil 118 at the bottom of the pot 92 in the argon rectification column. In this coil 118, the high pressure nitrogen stream gives off some heat to effect the driving off of any last amount of nitrogen from the liquid argon therein, and in so doing is further cooled. After leaving the coil 118, the high pressure nitrogen is expanded through reflux expansion valve 122 to a pressure of about 33 p.s.i.a. when the system is first started. Then, after the operation has continued for a while, the pressure is dropped to about 18½ to 19 p.s.i.a. to effect the very cold temperature as explained above.

The expanded stream 123 of low pressure nitrogen is then introduced, at this very low temperature, to the condenser 98, which represents the coldest point in the argon rectification column. This very cold temperature is controlled, as poined out previously, so that, when the column is first started up and some argon finds its way to the top of the column at substantially high percentages, much more so than when the column is operating under ultimate working conditions, the argon will not be frozen nor caused to clog up the column. This control is effected by the regulation of the valve in the conduit 125.

The low pressure nitrogen stream, after serving its function in the condenser 98 to condense the major portion of the argon which finds its way up to the top of the column, leaves the condenser by the conduit 124 and is introduced into the bottom of the shell of the heat exchanger 104 to cool the high pressure nitrogen stream in the pass 116 in a countercurrent operation. After leaving the heat exchanger 104 through the conduit 125, the low pressure nitrogen stream may be recycled to the storage tank and compressed for ultimate use and return to the system as the high pressure nitrogen stream 100.

Returning now to the rectification column 93, it will be noted that the operating pressure is within the range of about 4 to 5 p.s.i.g., at which pressure the boiling point and freezing point of argon are separated by between 5° to 5½° C., which gives more range than the 3½° C. separation at atmospheric pressure. In the column, the liquid argon is condensed at the bottom as substantially absolutely pure argon to the extent of 99.95% purity, or higher, which is demanded in a number of fields of use. The rising vapors above the introduction of the crude argon stream in the section 97 will comprise substantially all of the nitrogen and the noncondensible gases such as hydrogen which were introduced in the deoxygenation stage. The nitrogen which was present in the crude argon to the extent of 2 to 3% will comprise the major portion of this top gas and may be accompanied by a substantial percentage of argon, to the extent of about 20 to 30% argon. However, the actual quantity of argon in this waste gas is very small compared to the total amount recovered as pure argon. This top or waste gas leaves in stream 140 which is introduced to the heat exchanger 104 in the pass 141 for additional countercurrent cooling of the high pressure nitrogen stream in the pass 116. The waste gas then leaves the top of the heat exchanger through the conduit 142, and can be either vented or cycled to a storage bank for ultimate reclamation of the argon in some other stage of the process. For instance, a large percentage of the argon in this waste gas can be recovered by recycling the waste back to the main oxygen column.

In order to effect the very high recoveries of argon in the pure argon stream to the extent of 99.95% and upwards in percentages of argon, the efficiency of recovery of the argon ranges between 90 to 95%. Higher recoveries of argon might be at the expense of the purity of the argon, which is of the utmost importance in the process.

In this process, it will be noted that there are no complicated control devices required, and the entire control of the flow of materials is centered around the argon expansion valve 95, which controls the flow of the crude argon entering the deoxygenating units and finally the column 93. Further, the close temperature control required is maintained whenever and wherever there is danger of freezing argon, by means of the simple pressure regulation of the nitrogen refrigerant at about 33 p.s.i.a., which is just above the freezing point of argon to prevent freeze-up within the system.

A most efficient utilization of the refrigerant effect of nitrogen, which is especially well adapted as the refrigerant in the system, has been made possible. Also, by observance of the temperature-pressure properties of the nitrogen, an extremely simple regulation of the low temperatures within the system to prevent freeze-up of argon and yet at the same time to supply the proper cooling in the purification process has been effected.

This invention has been particularly described for the use of nitrogen as the sole refrigerant in the system. Such use of nitrogen only simplifies the process, but it shall be noted that in the preliminary cooling stages auxiliary refrigerants such as ammonia and freon could be employed. Also, it is contemplated that other refrigerant gases such as air could be employed where such gases could be expanded from a high pressure to a low pressure at which the boiling point is between the freezing and boiling points of argon. For instance, air could be expanded to about 23 to 24 p.s.i.a., which would give a BP of −188° F., but under this situation the argon rectification column would have to be operated at a higher pressure which would reduce the efficiency of recovery.

Also, although this invention has been particularly described in reference to the production of argon, it should be understood that it can be utilized wherever close low temperature control tolerances are required. For example, other rare element gases having close melting and boiling points can be controlled where the expanded refrigerant gas has a freezing point below that of the temperature involved. Further, the invention has application in the hydrocarbon field where extreme low temperature process control is desired.

Various changes in the piping and flow of materials within this process will be apparent to those skilled in the art when taken with the above description, and will be well within the scope of the teaching of this invention. Additional valves and conduits may very readily be employed to consume the argon while the system is being brought into production and taken out of production, but are not shown for reasons of simplicity. Such variations and modifications are intended to be within the teaching of this invention as defined by the claims appended hereto.

What is claimed is:

1. A process for the purification of crude argon containing oxygen and nitrogen as impurities which comprises reacting a slight excess of hydrogen with said oxygen over the stoichiometric requirement to form water, removing water from said crude argon, cooling said crude argon by heat exchange with a cold stream of low pressure nitrogen, passing said crude argon in a closed stream into the bottom of an argon rectification column to impart heat thereto and further cool said crude argon stream, introducing the cooled argon to a rectification column, separating liquefied argon as a purified bottom product from an overhead waste gas, and supplying nitrogen as a separate closed stream for cooling said crude argon and the top of said column, said purified argon being removed from said rectification column and further cooled by a low pressure nitrogen stream and then pumped in heat exchange relation with said crude argon for partial cooling of the same.

2. A process for the purification of crude argon containing nitrogen and hydrogen as impurities, which comprises cooling the crude argon, passing the cooled crude argon into an intermediate section of an argon purification column for rectification of said crude argon to a purified liquid argon at the bottom of said column and a waste gas at the top of said column, cooling the top of said column, withdrawing the purified liquid argon at the bottom of said column and the waste gas from the top of the column, passing a first stream of high pressure nitrogen into heat exchange relation with said waste gas and the bottom of the column to impart heat thereto and to precool said nitrogen, passing a second high pressure nitrogen stream into heat exchange relation with the pure argon to precool said second stream, cooling said high pressure nitrogen streams by expanding the same to a low pressure, utilizing one of said expanded nitrogen streams to cool the top of said column and to precool one of said high pressure nitrogen streams, and utilizing the other expanded nitrogen stream to cool the pure argon and to precool the crude argon and the other high pressure stream.

3. A process for the purification of crude argon containing nitrogen and hydrogen as impurities, which comprises cooling the crude argon, passing the cooled crude argon into an intermediate section of an argon purification column for rectification of said crude argon to a purified liquid argon at the bottom of said column and a waste gas at the top of said column, cooling the top of said column, withdrawing the purified liquid argon at the bottom of said column and the waste gas from the top of the column, passing a first stream of high pressure nitrogen into heat exchange relation with said waste gas to precool said nitrogen, passing a second high pressure nitrogen stream into heat exchange relation with the pure argon to precool said second stream, cooling said high pressure nitrogen streams by expanding the same to a low pressure and utilizing said separate low temperature and pressure nitrogen streams to cool the pure argon and the top of the column, said high pressure nitrogen streams being expanded from a high pressure to a low pressure of about 32.2 p.s.i.a., maintaining the low pressure at or above 32.2 p.s.i.a. to prevent the cooling of argon below its freezing point, and maintaining said column at about 4 p.s.i.g. to increase the temperature range between the freezing point and boiling point of argon.

4. In a system for the purification of crude argon, deoxygenation means including means for passing hydrogen into said crude argon gas in the presence of an oxygenating catalyst at a controlled rate slightly in excess of the oxygen present relative to the stoichiometric requirements to form water, heat exchange means, rectification column means for separating pure argon in liquid form from the bottom and waste gas from the top of said column, means for passing crude argon through said heat exchange means to cool the same and subsequently into said rectification column, means for passing pure argon in heat exchange relation with a refrigerant and subsequently through said heat exchange means, and means for passing the refrigerant through said heat exchange means.

5. In a system for the purification of crude argon, heat exchange means, rectification column means for separating pure argon in liquid form from the bottom and waste gas from the top of said column, means for passing crude argon through said heat exchange means to cool the same and subsequently into said rectification column, means for passing pure argon in heat exchange relation with a nitrogen refrigerant and subsequently through said heat exchange means, and means for passing the nitrogen refrigerant through said heat exchange means, said last named means including means for expanding a high pressure nitrogen stream to a low pressure at which the boiling point of nitrogen is about the temperature of the freezing point of argon.

6. In a system for the purification of crude argon, deoxygenation means including means for passing hydrogen into said crude argon gas in the presence of a catalyst at a controlled rate slightly in excess of the oxygen present relative to the stoichiometric requirements to form water, heat exchange means, rectification column means for separating pure argon in liquid form from the bottom and waste gas from the top of said column, means for passing crude argon through said heat exchange means to cool the same and subsequently into said rectification column, means for passing pure argon in heat exchange relation with a refrigerant gas and subsequently through said heat exchange means, and means for passing the refrigerant through said heat exchange means, said last named means including means for expanding a high pressure refrigerant stream to a low pressure at which the boiling point of the refrigerant is about the temperature of the freezing point of argon.

7. In a system for the purification of crude argon, heat exchange means, rectification column means for separating pure argon in liquid form from the bottom and waste gas from the top of said column, means for passing crude argon through said heat exchange means to cool the same and subsequently into said rectification column, means for passing pure argon in heat exchange relation with a nitrogen refrigerant and subsequently through said heat exchange means, and means for passing the nitrogen refrigerant through said heat exchange means, said last named means including means for expanding a high pressure nitrogen stream to a low pressure at which the boiling point of nitrogen is about the temperature of the freezing point of argon, and further including means for passing at least a portion of said high pressure nitrogen stream into heat exchange relation with the bottom of said rectification column, and means for passing at least a portion of said cold low pressure nitrogen into heat exchange relation with the top of said column.

8. In a system for the purification of crude argon, three heat exchangers, rectification column means for separating pure argon in liquid form from the bottom and waste gas from the top of said column, means for passing crude argon through one of said heat exchangers to cool the same and subsequently into said rectification column, means for passing pure argon through a second heat exchanger in heat exchange relation with a nitrogen refrigerant and subsequently through the one of said heat exchangers, means for passing the waste gas through the third heat exchanger, and means for passing nitrogen through said heat exchangers as a refrigerant, said last named means including means for expanding a high pressure nitrogen stream to a low pressure at which the boiling point of nitrogen is about the temperature of the freezing point of argon, and for conducting the said low pressure nitrogen through the second heat exchanger.

9. In a system for the purification of crude argon, three heat exchangers, rectification column means for separating pure argon in liquid form from the bottom and waste gas from the top of said column, means for passing crude argon through one of said heat exchangers to cool the same and subsequently into said rectification column, means for passing pure argon through a second heat exchanger in heat exchange relation with a refrigerant gas and subsequently through the one of said heat exchangers, means for passing the waste gas through the third heat exchanger, means for passing the refrigerant through said heat exchangers, said last named means including means for passing high pressure refrigerant gas in separate streams through the first and third heat exchangers, means for expanding said high pressure refrigerant streams to separate cold low pressure streams, wherein the boiling point of at least one low pressure stream is about the temperature of the freezing point of argon, means conducting said one low pressure stream through the second heat exchanger, and means conducting the other low pressure stream to the top of the column to refrigerate the same.

10. In a system for the purification of crude argon, at least two heat exchangers, rectification column means for separating pure argon in liquid form from the bottom and waste gas from the top of said column, means for passing crude argon through said heat exchange means to cool the same and subsequently into heat exchange relation with the bottom of said column, means for then expanding said crude argon and passing it into an intermediate section of said rectification column, means for passing pure argon in heat exchange relation with a nitrogen refrigerant and subsequently through one of said heat exchangers, means for passing the waste gas through the second heat exchanger, means for passing nitrogen through said systems as a refrigerant, said last named means including means for passing high pressure nitrogen gas in separate streams through both said heat exchangers, and means for expanding said high pressure nitrogen streams to separate cold low pressure streams at which the boiling point of nitrogen is about the temperature of the freezing point of argon.

11. In a process of separating a first gas from a mixture of first and a second gas, including the steps of: introducing the mixture under relatively high pressure to a column and expanding it into the column to a relatively lower pressure, causing the first gas to descend as a liquid to the bottom of the column and the second gas to ascend to the top as a gas; refrigerating the top of the column by expanding a refrigerant and passing it in confined, out-of-contact heat exchange relationship with the contents of the top of the column; maintaining the refrigerant in liquid-gas equilibrium; maintaining the gas pressure thereof to a predetermined minimum so that the temperature of the refrigerant is held at a predetermined minimum that is not low enough to freeze the contents of the top of the column; and regulating the supply of refrigerant being expanded by throttling to a greater or lesser degree the refrigerant gas expanded into the heat exchange relationship with the top of the column, while maintaining the resultant pressure thereof substantially constant, and thereby regulating the pressure change in the expansion to vary the amount of refrigeration produced.

12. The process of claim 11, wherein the first component gas is argon and the second component gas is mainly nitrogen.

13. The process of claim 12, wherein the refrigerant is nitrogen.

14. The process of claim 12, wherein the refrigerant is air.

15. The process of claim 11, including withdrawing the first gas from the column in liquid phase; subcooling the same by out-of-contact heat exchange with a refrigerant having a boiling point at atmospheric pressure below the freezing point of the first component gas; maintaining the refrigerant in liquid-gas equilibrium; and providing a gas-phase pressure of the refrigerant at or above a minimum such that the boiling point of the refrigerant is raised above the freezing point, and below the boiling point, of the first gas.

16. The process of claim 15, wherein the refrigerants constitute two branches of the same refrigerant source, but are separated to afford individual gas-phase pressure control.

17. In a process of separating argon from a mixture of argon and a second gas that is primarily nitrogen, including the steps of: expanding the gas mixture into a column at predetermined pressure to start the column into operation; supplying a refrigerant gas in liquid-gas equilibrium in out-of-contact heat exchange with the contents of the top of the column; providing a pressure on the refrigerant gas that causes the temperature to be sufficiently high to prevent freezing of argon at the top of the column; operating the column until the contents of the top of the column are the second gas without any substantial amount of separable argon; and then reducing the pressure on the refrigerant gas to a value to provide a temperature substantially below the freezing point of argon, thereby to increase the operating efficiency of the column.

18. The process of claim 17, plus thereafter adjusting the pressure of the refrigerant gas prior to its expansion, without changing its pressure after expansion, to accommodate variations in the amount of refrigeration required.

19. In an apparatus for separating a first gas from a mixture of first and second gases: a rectification column; a gas mixture supply conduit having an expansion valve therein, connected to a middle part of the column; a refrigerant gas heat exchanger at the top of the column; means to expand a high pressure refrigerant gas into the heat-exchanger and to partially liquefy the same so that it may be in liquid-gas equilibrium in the heat-exchanger, the means including a refrigerant gas conduit having an adjustable expansion valve therein whereby the quantity of refrigeration may be adjusted, connected to the heat exchanger; and a constant pressure valve means connected to the outlet side of the heat exchanger to maintain a minimum gas pressure in the heat exchanger so that the apparatus may hold the boiling point of the refrigerant gas above the point at which the first gas may freeze regardless of adjustment of the expansion valve, and the constant pressure valve means being arranged to change the pressure to a lower value when the column is operating in a manner that does not cause delivery of substantial quantities of the first gas at the top of the column.

20. The apparatus of claim 19, plus a subcooler connected to the lower part of the column to receive the first gas therefrom; a refrigerant gas supply means for the subcooler to supply a refrigerant in liquid-vapor equilibrium; and pressure regulating means in the supply means to hold a minimum pressure on the refrigerant gas to maintain its pressure above that at which its corresponding temperature would freeze the first gas.

21. In an apparatus for separating gases of different boiling points: a rectification column, an inlet into the column for introduction of a gas mixture of the gases thereinto, the components of which are to be separated by rectification; an outlet for the high boiling point gas at the lower end of the column, an outlet for the low boiling gas at the upper end of the column; a subcooler heat-exchanger for the high boiling point gas; a condenser for the upper part of the column; a high pressure refrigerant gas source; two branches therefrom, the first branch having an expansion device and thereafter being connected through the subcooler; the second branch having another expansion device and thereafter being connected through the condenser, each branch having its expansion device independently pre-set to provide temperatures in the subcooler and condenser, respectively, that are designed to cool the gases with which it is in heat exchange, without freezing them, and the branch through the subcooler having a constant-pressure regulator to maintain the pressure within the subcooler regardless of variations in the pressure of the high-pressure refrigerant ahead of the expansion device.

22. In an apparatus for separating gases of different boiling points: a rectification column, an inlet into the column for introduction of a gas mixture of the gases thereinto, the components of which are to be separated by rectification; an outlet for the high boiling point gas at the lower end of the column, an outlet for the low boiling gas at the upper end of the column; a subcooler heat-exchanger for the high boiling point gas; a condenser for the upper part of the column; a high pressure refrigerant gas source; two branches therefrom, the first branch having an expansion device and thereafter being connected through the subcooler; the second branch having another expansion device and thereafter being connected through the condenser, each branch having its expansion device independently pre-set to provide temperatures in the subcooler and condenser, respectively, that are designed to cool the gases with which it is in heat exchange, without freezing them, and the branch through the subcooler having a constant-pressure regulator to maintain the pressure within the subcooler regardless of variations in the pressure of the high-pressure refrigerant ahead of the expansion device, and a heat-exchanger in each refrigerant gas branch ahead of its expansion device.

23. The process of claim 22 in which the nitrogen refrigerant is expanded from a high pressure of about 1000 to 2000 p.s.i.a. to a liquid vapor phase equilibrium at about 32.2 p.s.i.a.

References Cited in the file of this patent

UNITED STATES PATENTS

| | | |
|---|---|---|
| 1,360,853 | Wucherer et al. | Nov. 30, 1920 |
| 1,664,205 | Fonda | Mar. 27, 1928 |
| 2,057,804 | Twomey | Oct. 20, 1936 |
| 2,146,197 | Twomey | Feb. 7, 1939 |
| 2,284,662 | Kahle | June 2, 1942 |
| 2,423,273 | Van Nuys | July 1, 1947 |
| 2,663,166 | Anderson | Dec. 22, 1953 |
| 2,728,205 | Becker et al. | Dec. 27, 1955 |